(12) United States Patent
Beckwith

(10) Patent No.: US 6,753,792 B2
(45) Date of Patent: Jun. 22, 2004

(54) DISTRIBUTION LINE CAPACITOR MONITORING AND PROTECTION MODULE

(76) Inventor: Robert W. Beckwith, 2794 Camden Rd., Clearwater, FL (US) 33759

( * ) Notice: Subject to any disclaimer, the term of this patent is extended or adjusted under 35 U.S.C. 154(b) by 218 days.

(21) Appl. No.: 10/037,719

(22) Filed: Jan. 4, 2002

(65) Prior Publication Data

US 2002/0089802 A1 Jul. 11, 2002

Related U.S. Application Data (60) Provisional application No. 60/260,498, filed on Jan. 9, 2001.

(51) Int. Cl.[7] ............................................... H04Q 9/00
(52) U.S. Cl. ................... 340/870.07; 307/116; 361/16; 700/292
(58) Field of Search ..................... 340/870.07; 307/112, 307/115, 116; 700/292; 361/16

(56) References Cited

U.S. PATENT DOCUMENTS 5,646,512 A * 7/1997 Beckwith .................... 323/257
6,008,548 A * 12/1999 Fenner et al. ................ 307/105
6,114,778 A * 9/2000 Rostron et al. .............. 307/116
6,336,059 B1 * 1/2002 Novosel et al. .............. 700/292

* cited by examiner

Primary Examiner—Timothy Edwards
(74) Attorney, Agent, or Firm—Leo J. Aubel (57) ABSTRACT

A device comprising a fault detector and communications module. The communications module can transmit and receive information and data via a commercial two-way wireless system, which may include two-way paging technology. The inventive device is capable of measuring imbalance currents in a remote capacitor bank, and if the imbalance current exceeds a set threshold the inventive device communicates this information, and/or other information, to an electric utility control center. The communications module is mounted using a standard utility meter socket, thereby allowing the communications module and an associated adaptive capacitor control to be stacked and mounted on the same meter socket to provide an integral unit. A two-way infrared communication port is also provided.

16 Claims, 6 Drawing Sheets

DISTRIBUTION LINE CAPACITOR MONITORING AND PROTECTION MODULE

This application claims the benefit of Provisional Application No. 60/260,498 filed Jan. 9, 2001.

FIELD OF THE INVENTION

This invention generally relates to communication devices for use with electric power distribution lines which include automatically operable, and remotely controlled and monitored capacitor banks used to correct for an inductive load imbalance in electric power distribution systems. The invention provides two-way wireless communications for communicating with a utility system control center to transmit and receive information and control data.

BACKGROUND OF THE INVENTION

Capacitor bank controls for selectively connecting and disconnecting capacitor banks to the distribution lines of electric power systems are known. In one type of application, remote control systems measure parameters locally at the capacitor bank being switched and react thereto or send the locally measured parameters to a control center. The control center then selectively sends connect, or disconnect commands, or other data to the capacitor control for that bank.

Various communication methods are used to connect the remote control systems to the control center. Two-way communication methods include known VHF radio, 900 MHz narrow band FM, cellular phone, and commercial two-way paging systems.

Capacitor banks have local protection, usually fuses, which disconnect all or part of the capacitor bank in the event of a failure of a capacitor. Known, two-way control systems do not include locally initiated feedback from the bank location to a control center notifying that a failure has occurred.

Capacitor banks and controls are often mounted and connected using standard electric utility meter socket connectors. In the prior art, if a capacitor bank and a separate control are to be mounted, then two meter sockets are normally required. The invention discloses an integrated device that adapts a four-blade connector to connect to a standard five-blade electric utility distribution line meter socket.

SUMMARY OF THE INVENTION

A distribution line fault detector and communications device using commercial two-way communications systems which may include two-way paging technology to control and monitor remotely located capacitor banks are provided as an integral unit. The inventive device can receive data to control the operation of said capacitor bank and can also initiate communications to indicate the status of the capacitor bank. Also the inventive device communicates the need for repair and the location of the bank needing repair, all via a two-way communication system. The device is mounted in a housing that is integral with an adaptive capacitor control.

The foregoing features and advantages of the present invention will be apparent from the following more particular description of the invention. The accompanying drawings, listed herein below, are useful in explaining the invention.

DESCRIPTION OF THE INVENTION

Figure 1:
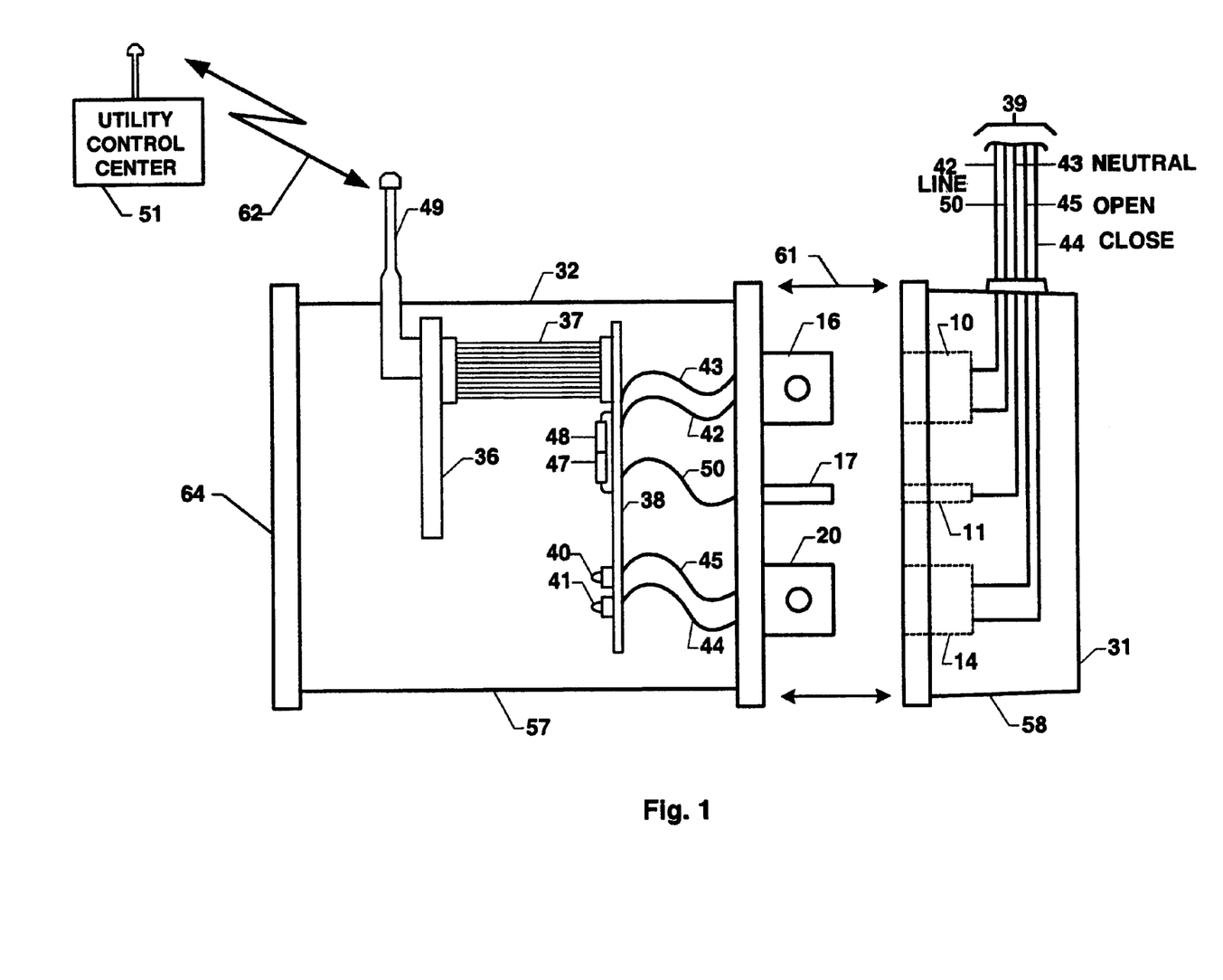
FIG. 1 depicts the invention in communications with in an electric utility distribution system.
Figure 4:
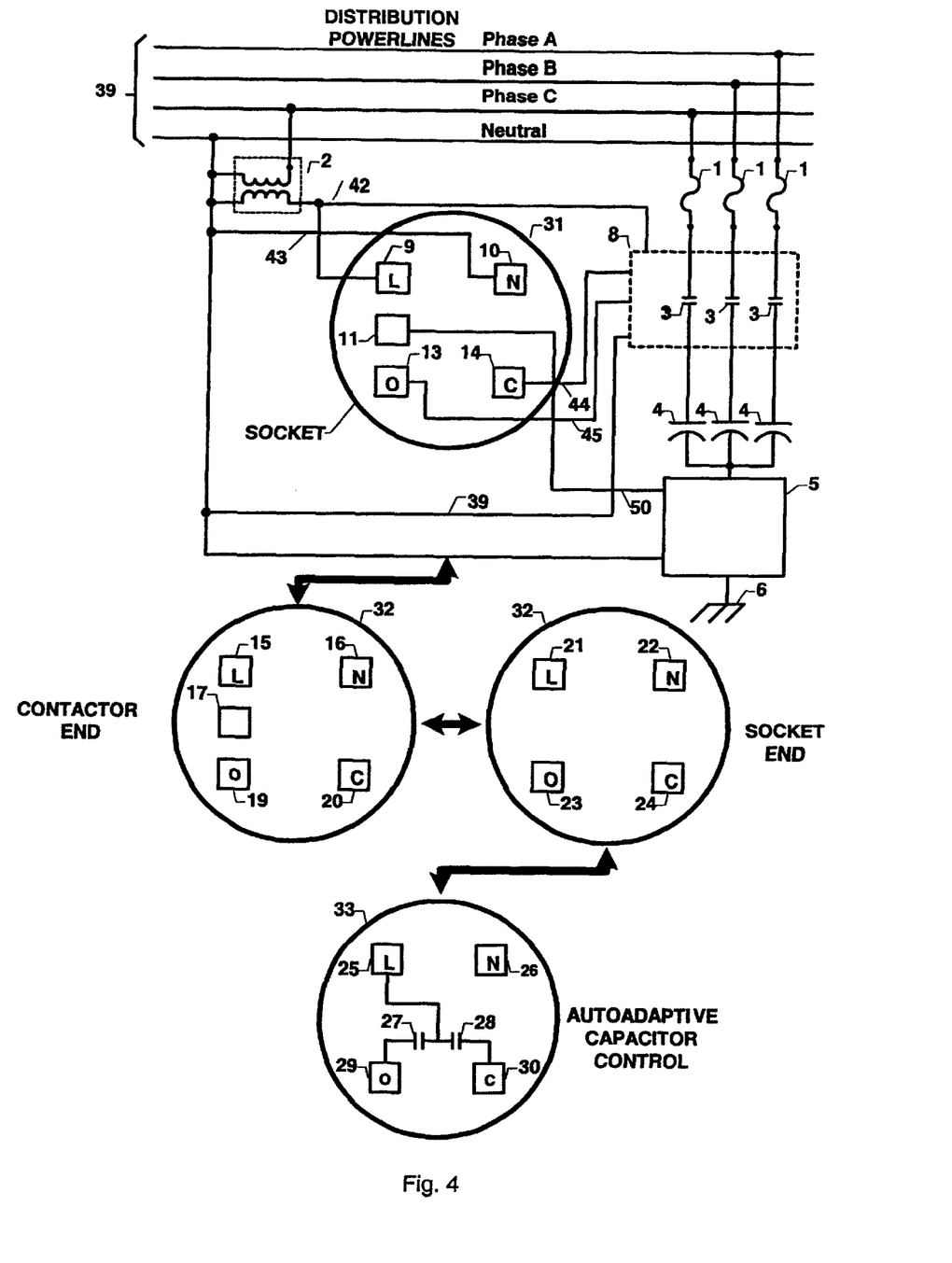
FIG. 4 shows a schematic of the connections of the terminals and electrical components useful in describing the invention.

FIG. 1, shows the inventive communication module 57. Module 57 is mounted on a standard five-blade meter socket 58. The terminals or connector blades of module 57 mate with the socket blades of socket 58; that is, the three blades 16, 17 and 20 of module 57, visible in FIG. 1, respectively connect to the three blades 10, 11 and 14 of socket 58. Refer now also to FIG. 4, that shows the electrical connections of blade terminals 15, 16, 17, 18 and 20 of module 57 to utility meter socket 58 which, in turn, connects to the three-phase distribution lines and control lines, all generally numbered as 39. The distribution lines are designated as phases A, B, C and neutral, as is customary. As indicated in FIG. 1, the communications module 57, provides wireless two-way communication via antenna 49, with an electric utility control center 51, as will be further explained, herein below. FIG. 1 depicts that module 57 is remotely located relative to utility center 51.

Module 57 is mounted within a tubular housing 32. One end of housing 32 is covered by cap 64 and the other end of housing is mounted on a tubular housing 31 that forms part of the meter socket 58. Module 57 includes a microprocessor interface board 38 including a power supply circuitry, and a two-way messaging circuit board 36, also to be described herein below.

Refer now to the circuit diagram in FIG. 4, which shows the circuitry and components that are connected to inventive module 57. Fuses 1, motorized controller 8, switches (generally labeled) 3, capacitors, generally labeled 4 (the three capacitors labeled 4 comprise the capacitor bank), current transformer 5 and transformer 2 develop outputs which are connected to module 57. As shown in FIG. 4, these enumerated components are mounted separately from housings 31 and 32. The circuitry further includes diode transient protectors 47 and 48 mounted within meter housing 31. Refer now to both FIGS. 1 and 4 showing wire leads 42, 43, 44, 45 and 50, that extend from an interface and power supply circuit board (interface board) 38 in module 57, and connect to terminals 9, 10, 14, 13 and 11 of the meter socket. The interface and board 38 includes a suitable known type of microprocessor.

The three fuses generally labeled 1 (a fuse is connected to each of the phase lines) provide circuit protection in the event of a failure of the respective ones of capacitors 4. The operation of the capacitors 4 (the capacitor bank), is known in the art. The motorized controller 8, of any suitable known type, selectively connects and disconnects the capacitors 4 from the power lines by using the switches, generally labeled as 3. The connection and disconnection are controlled by signals received from the motorized controller 8 at the "O" and "C" terminals 13 and 14 of the meter socket 31.

A current sensing device 5 (see also FIG. 5) comprising a known type of toroidal collar 64 is mounted on a line 63 connected to earth ground labeled 6. The output of collar 64 provides an indication of the current unbalance in distribution lines via the the circuitry, as will be discussed herein below. A voltage output from collar 64 is obtained across resistor 65 and zener diode 66 via a twisted line pair 70 and 71 that connect to terminals 10 and 11 of meter socket 58. Blade terminals 10 and 11 mate with terminals 16 and 17 of the module 57, respectively, and thence to interface board 38, also in module 57. As alluded to above, the collar 5, connected to the capacitors 4, provides an analog signal to the interface circuit board 38 indicating the current imbalance of the capacitors (bank) 4. Transient protectors 47 and 48 (shown as connected to socket terminal 11) limit the voltage coupled to interface and power supply circuit board 38. As is known, transient protectors 47 and 48 absorb damaging voltage transients which occur due to phenomena such as lightning hits on the power lines.

Transformer 2 (FIG. 4) which has its primary shown as connected between the phase C distribution line and neutral, provides isolated power for the power supply and interface board 38.

Figure 5:
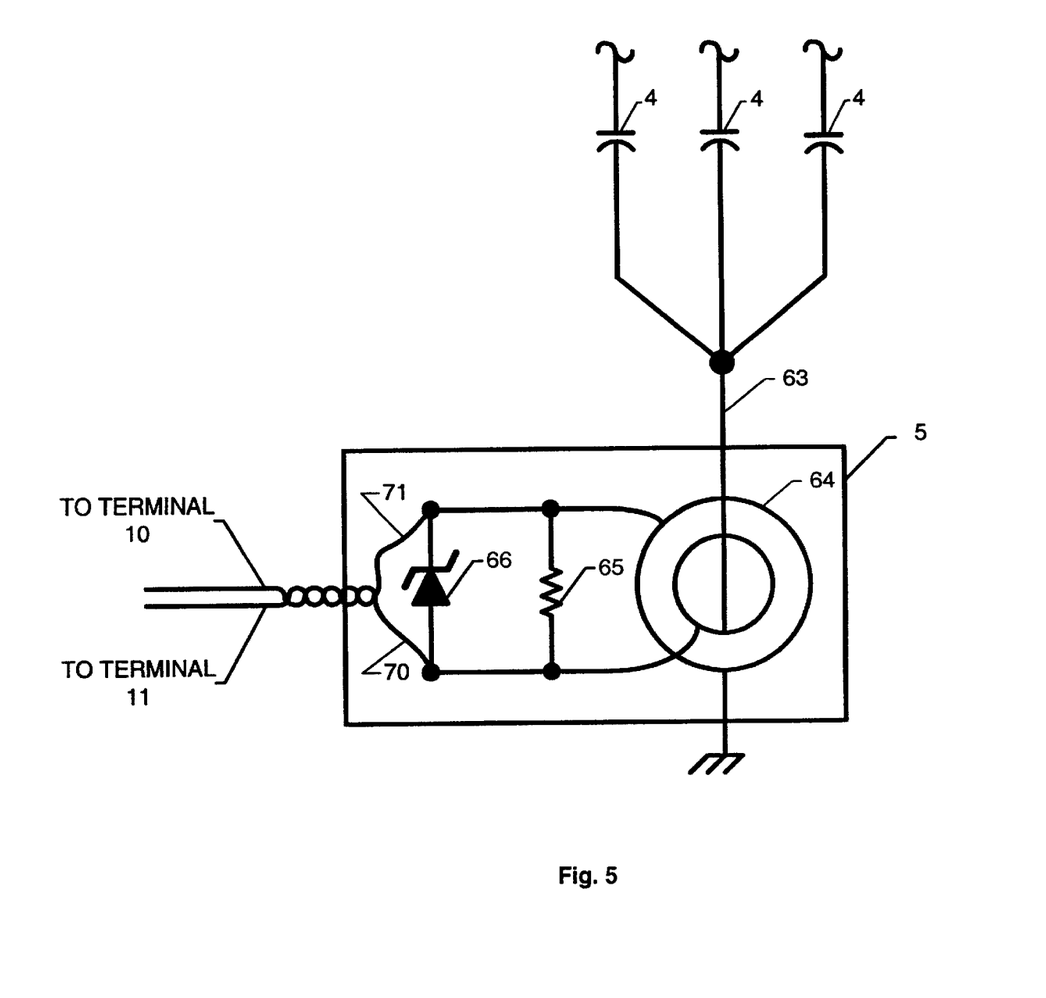
FIG. 5 shows a schematic of a current sensing device comprising a collar (toroidal core)

The interface board 38 includes analog-to-digital conversion capability for measuring the voltage at terminal 17 which connects to terminal 11 and thence through lead 71 to collar 64 of the current sensing device 5 (see FIGS. 1 and 5).

The voltage on terminals 11 and mating terminal 17 developed by sensing device 5 is proportional to the current imbalance in the capacitor bank 4;this imbalance is sensed by collar 64. If a capacitor bank 4 has failed, or if a fuse 1 has blown (opened), or a switch 3 has failed, the current imbalance will rise above a threshold set in the interface board 38. The interface board 38 includes a microprocessor and an associated program that provide processing controls. For example, it is known that recognizing change in VARs at a substation is a means of discovering blown capacitor cans; the invention monitors the output of sensing device 5 and initiates communications indicating such change to the utility control center 51. Other communication may be generally effected by known types of services including messaging over the Internet.

The threshold set by the interface board 38 program can be modified by the utility control center 51. Once the threshold parameters have been exceeded, for example if the threshold value has been exceeded for say a period of an hour, the interface board 38 initiates communication through the two-way wireless messaging module 57 to alert the utility system control center 51 of the fault and its location. Utility system control center 51 can then dispatch a repair crew to fix the defect.

Figure 2:
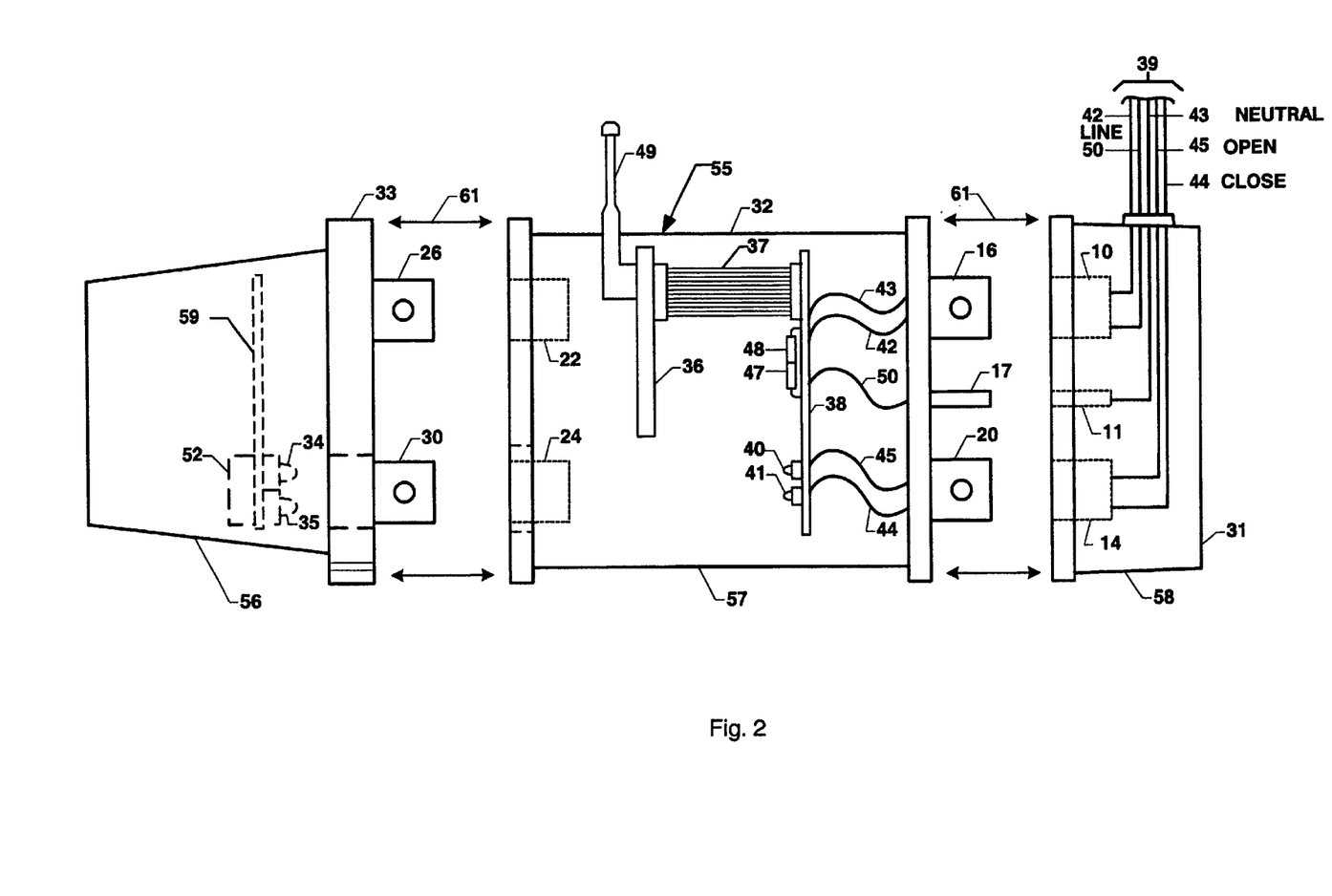
FIG. 2 illustrates the invention incorporating an adaptive capacitor control.

As indicated in FIG. 2, the two-way messaging circuit board 36 of communications module 57 is connected to antenna 49 to enable wireless communication with the utility control center 51. Messaging circuit board 36 is connected to interface board 38 via cabling 37 to thereby send and receive data there through. As indicated in FIG. 2 by the lightning arrow line 62, the two-way messaging board 36 of module 57 communicates with utility system control center 51. A commercial RF paging network such as the Motorola ReFLEX™ system, or similar, is employed in one embodiment. Note that other types of two-way communication systems besides paging may be used in lieu of the Motorola system.

The message board 36 and the interface board 38 are thus responsible for communicating with and responding to communications from control center 51; the protocol used is dependent on the type of communication method.

In one mode, the inventive device operates as follows. The collar 64 of current sensing device 5 continually monitors the current imbalance on line 63 which is indicative of the current imbalance in the three phase distribution line. The utility control center 51 sends out a request (polls) via the two-way wireless communications link 62 for information as to the status of the capacitor bank 4. The communications board 36 receives the wireless message and connects to interface board 38 and the included microprocessor to obtain the necessary data. The communications board 36 receives data and transmits the data via the wireless communications link 62 to control center 62. The utility control center 51 can thus obtain essentially real time information as to the status of the capacitor bank.

In a con-current mode of operation, (since the collar 64 of current sensing device 5 continually monitors the current imbalance on line 63), when a current imbalance is above a pre-selected threshold (set by interface board and/or by utility control center 51), sensing device 5 inputs this information, through terminal 10 and 11, to the interface board 38. Board 68 processes this information to determine whether there is an imbalance of current above a pre-selected threshold, and for a selected period of time. Such current imbalance would indicate a fault, such as a blown fuse, blown capacitor can etc. Interface board next activates the two-way wireless communications board 36, and board 36 communicates this information via antenna 49 to the utility control center 51.

As noted above, the invention the two-way communications medium consists of a two-way paging system.

Said in another way, if a capacitor fails, causing one or more of the fuses 1 open, or if a switch 3 fails, the imbalance current will exceed a pre-set threshold programmed into the microprocessor on interface board 38. Interface board 38 monitors the imbalance current in the capacitor bank by measuring the voltage output from sensing device 5. Interface board 38 will initiate communication with control center 51 through two-way messaging module 57 to inform the control center of the failure.

Figure 3:
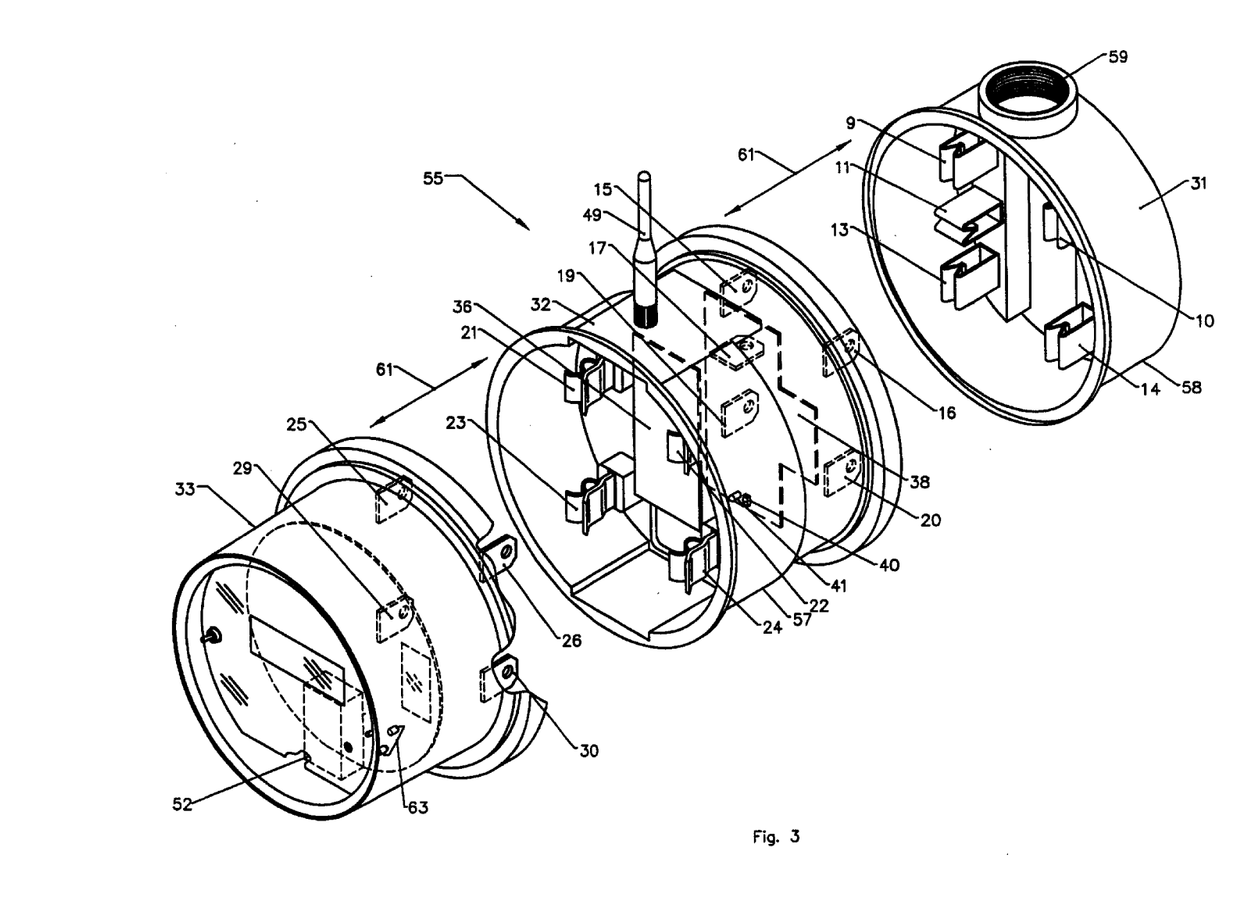
FIG. 3 shows an isometric view of the embodiment of FIG. 2.

A second embodiment of the invention is shown in FIGS. 2 and 3, wherein an autoadaptive capacitor control 56 is mounted with the communications module 57 and the meter socket 56, to form an essentially integral unit 55. In the embodiment shown, a known Beckwith Electric Co., Inc. M-2501A Autoadaptive Capacitor Control 59 is utilized; the microprocessor board 59 for capacitor control 59 is shown in schematic outline. AS mentioned above, various other adaptive capacitor controls are known in the art. Autoadaptive capacitor control 56, also has a tubular housing 33, similarly as communications module 57. As can be appreciated from FIGS. 2 and 3 the capacitor control housing 33, the communication module housing 32, and the socket meter housing 31 are stacked, i.e., nested into one another in series and are mounted as an integral unit 55, as indicated by the arrows 61 in FIGS. 2 and 3.

As best seen in FIGS. 3 and 4, autoadaptive capacitor control 56, includes male socket connectors 25, 26, 29 and 30 (a four-blade socket) that extend rearwardly from housing 33 and respectively connect to female connectors 21, 22, 23, and 24 which extend toward the front of housing 32 of communications module 57. In turn, male connectors 15, 16, 19 and 20 that extend rearwardly from housing 32 respectively connect to female connectors 9, 10, 13 and 14 of the standard meter housing 31. The embodiment shown in FIGS. 2 and 3 thus provides an apparatus comprising an adaptive capacitor control, a communications and interface module and a standard (five-blade) electric utility meter socket comprising essentially an integrated unit for mounting such as in a remote location to connect to on an electric utility distribution line.

Autoadaptive capacitor control 56 selectively sends connect and disconnect commands through switches 27 and 28 (FIG. 4) to motorized controller 8 through terminals 29 and 30. Terminals 29 and 30 are connected through the housing 32 to terminals 13 and 14, of meter socket 31, and thence to motorized controller 8. The adaptive capacitor control 56 can make decisions autonomously as to whether capacitor bank 4 should be connected or disconnected by periodically measuring the voltage between terminals 25 and 26.

The adaptive capacitor control 56 can also receive control commands from the control center 51 via the message board 36 and the interface board 38. Capacitor control 56 can also communicate module interface board 38 through the infrared communications port comprising infrared components 34 and 35 and 40 and 41. The status of the adaptive capacitor control 56 can also be polled by the interface board 38 through the same infrared port.

The infrared emitters 34 and 41 and infrared receivers 35 and 40 are mounted in a keyed or preset way to be properly connected optically when the housing 33 of autoadaptive capacitor control 56 is mounted on the housing 32 of the communications module 57.

It is important to note that the adaptive capacitor control 56 will effectively to control the capacitor bank 4 whether or not collar 64 of sensing device 5 is in place. The standard five blade socket 58 used herein which has five blade terminals 9, 10, 11, 13, 14, (see FIG. 3) also fits (mates with) the four blade configuration 25, 26, 29 and 30 in housing 33 of the Beckwith Electric Co., Inc. M-2501A Autoadaptive Capacitor Control used in the preferred embodiment of the invention.

The autoadaptive capacitor control 56 measures the line voltage between terminals 25 and 26. Based on pre-loaded voltage profiles, the autoadaptive capacitor control 56 will make a decision to maintain the status, or to open or close switches 3 by sending signals to motorized controller 8 via connection paths 29, 23, 19, 13, 45 and 30, 24, 20, 14, 44 thus disconnecting or connecting capacitor bank 4 to the distribution power lines.

The utility system control center 51 can request messaging module 55 to report the status of the capacitor bank 4. Control center 51 may also request data regarding other parameters which are available locally. For example, interface board 38 can communicate with autoadaptive capacitor control 56 through the infrared port to request the capacitor control 56 to send to interface board 38 selected data which the capacitor control 56 has stored over some time period; for example, specifying the line voltage measurements which have been made during a given period of time. This data is then sent to control center 51 by the two-way messaging module 36. Control center 51 can also send override commands to the interface board 38 to command autoadaptive capacitor control 56 to open or close switch 3, thus disconnecting or connecting capacitor bank 4. The control center 51 can also send new program information to interface board 38 to be used by interface board 38, or to be sent through the infrared ports to adaptive capacitor control 56 for the purpose of redefining the pre-loaded profiles and operational characteristics of either the interface board 38 or the adaptive capacitor control 56.

The housing 32 of autoadaptive capacitor control 56 also includes an infrared port indicated at 52 and 63 which optically connects to infrared devices 34, 35, 40 and 41 from local points external to the housing. This enables communication from, and to, the interface board 38 from external devices (not shown) having infrared ports. For instance, a personal digital assistant (PDA) can then be used for inputting data, or for obtaining data, as to the status of the capacitor bank.

The invention continuously monitors local parameters on the power lines and reports by exception to control center 51. Control center 51 can then automatically and monitor and/or control the connection status of the capacitor bank to the power distribution system and can also automatically generate repair orders for failed components. The "report by exception" feature of the invention is accomplished by monitoring local system VAr (net volt-ampere reactive) and capacitor bank ground return parameters, comparing them to non-failure conditions and continuously reporting exceptions until resets, or repairs, are initiated.

Figure 6:
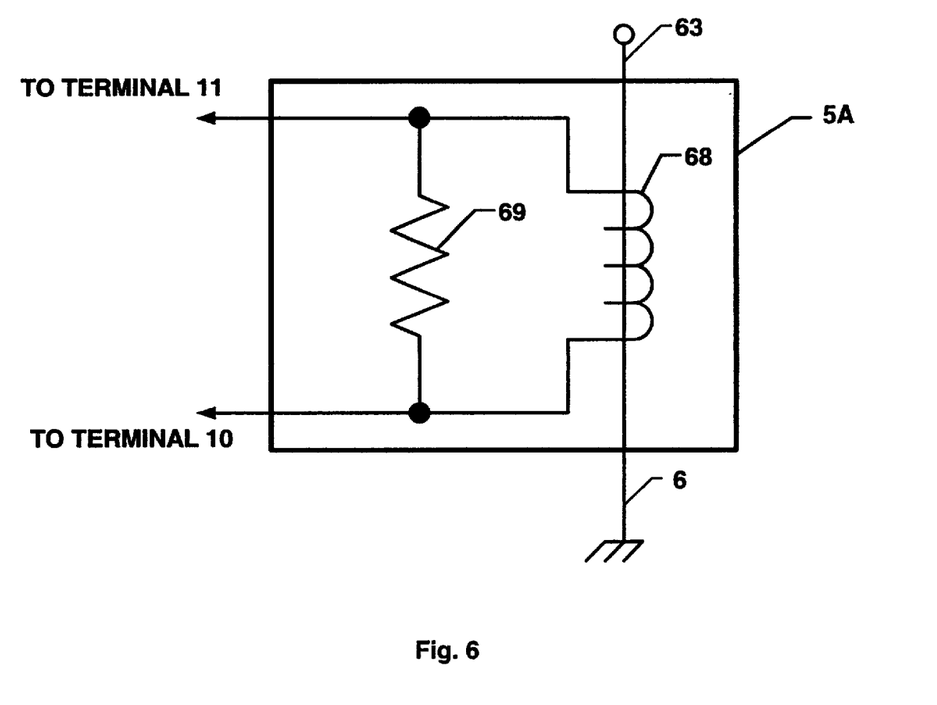
FIG. 6 shows a schematic of the current sensing device utilizing a current transformer.

FIG. 6 shows a current sensing device 5A comprising a current transformer 68 which provides a voltage output across resistor 69 to terminals 11 and 10, and may be utilized in lieu of device 5. The operation of sensing device 5A is essentially identical to that of sensing device 5, described above.

To summarize, the present invention provides an apparatus and method of monitoring capacitor banks for status, for obtaining failure information, and for initiating wireless communication to alert repair operations for those capacitor bank locations in need of repair.

While the invention has been particularly shown and described with reference to a particular embodiment thereof, it will be understood by those skilled in the art that various changes in form and detail may be made therein without departing from the spirit and scope of the invention.

I claim:

1. A control and communication device for communicating with a three phase electric power line communications center via a two-way wireless communications means, said device comprising
    a) capacitor bank switching controls;
    b) a two-way communications module for use with said capacitor bank switching controls for enabling communication via said two-way wireless communication means; and
    c) program means in said module for responding to requests received from said center for information from, and operations of, said capacitor banks switching controls.

2. A device as in claim 1 wherein said two-way wireless communications module comprises a two-way paging module.

3. A device as in claim 1 including a current imbalance sensing device for obtaining information as to the operation and status of said capacitor banks.

4. Apparatus as in claim 3 wherein said sensing device comprises a collar or toroidal core.

5. A control and communication device for communicating between a capacitor bank and a electric power control center wherein said capacitor bank is connected to three-phase distribution lines, said device comprising
    a) a two-way wireless communications module including a microprocessor for communicating with said center;
    b) electrical leads connecting a capacitor bank switching control and a microprocessor interface board;
    c) current sensing means; and d) microprocessor program means responsive to said sensing means for selectively enabling said two-way wireless communications module to transmit to said center information from, and data of operations, of said capacitor bank switching control.

6. A device as in claim 5 wherein
   a) a toroidal core or collar is connected to sense the imbalance in current flowing in the distribution lines; and
   b) said program means sets thresholds for initiating action in response to said imbalance of current.

7. A device as in claim 5 wherein
   a) a current transformer collar is connected to sense the imbalance in current flowing in the distribution lines; and
   b) said program means sets thresholds for initiating action in response to said imbalance of current.

8. A control and communication device for communicating between a capacitor bank and a electric power control center wherein said capacitor bank is connected to three-phase distribution lines, said device comprising
   a) an adaptive capacitor control for monitoring and controlling a capacitor bank;
   b) a two-way wireless communications module including an microprocessor interface board and a two-way messaging board for communicating with said center;
   c) a meter socket:
   d) a two-way communications means connecting a capacitor bank switching control and said microprocessor interface board;
   e) a current sensing mean;
   f) said autoadaptive capacitor control selectively operating in conjunction with said interface board to interrelate with said capacitor bank switching control; and
   g) microprocessor program means responsive to said sensing means for activating said two-way wireless communications module to transmit information to said center of information from, and operations of, said capacitor bank switching control.

9. A device as in claim 8 further including
   a) a five blade meter socket;
   b) said autoadaptive capacitor control comprising a Beckwith Electric Co. M-2501A control having a four blade connector;
   c) an integral housing formed of said adaptive capacitor control stacked onto said communications module and said communications module stacked on said meter socket wherein said communications module has mating blades at one end thereof which mate with said meter socket and blades on the other end which mate with the four blade socket of the autoadaptive capacitor; and
   c) said microprocessor interface board operating selectively either independently of, or in combination with said M-2501A adaptive capacitor control.

10. A device as in claim 8 further including an infrared communication port.

11. A device as in claim 8 wherein said two-way messaging board comprises Motorola, Inc. ReFlex (TM) two-way paging technology.

12. A method of operating switching controls for three phase electric power distribution line capacitors consisting of the steps of:
   a) receiving requests for data by receivers of wireless two-way messaging modules;
   b) obtaining said requested data from said capacitor switching controls; and
   c) replying to said requests using transmitters of said two-way messaging modules.

13. A method as in claim 12 further including the steps of
   a) assigning a location identification of said capacitor banks modules; and
   b) sending said identification with the message transmitted.

14. A method as in claim 12 further including the step of
   a) obtaining data from said capacitor switching controls by using infra red ports on said autoadaptive capacitor controls and said communications module.

15. A method as in claim 12 further including the step of communicating with said capacitor switching control using infrared communication from hand-held devices.

16. A method as in claim 12 further including the steps of
   a) sensing imbalance current from line to neutral;
   b) comparing said imbalance current to a pre-set threshold, and
   c) if said threshold is exceeded, sending data and location identification information using said two-way messaging system,
   whereby information may be used to dispatch maintenance personnel to the capacitor bank location.

* * * * *